United States Patent
Kobayashi et al.

(10) Patent No.: US 7,306,281 B2
(45) Date of Patent: Dec. 11, 2007

(54) STRUCTURE FOR MOUNTING VEHICLE SEAT

(75) Inventors: Shinya Kobayashi, Wako (JP); Shigeto Yasuhara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 29 days.

(21) Appl. No.: 11/421,939

(22) Filed: Jun. 2, 2006

(65) Prior Publication Data
US 2006/0273610 A1 Dec. 7, 2006

(30) Foreign Application Priority Data
Jun. 3, 2005 (JP) ............................. 2005-164542

(51) Int. Cl.
*B60J 7/00* (2006.01)
(52) U.S. Cl. ..................................... 296/204
(58) Field of Classification Search ................ 296/204, 296/209, 63, 64, 193.07
See application file for complete search history.

(56) References Cited

U.S. PATENT DOCUMENTS

| | | | | |
|---|---|---|---|---|
| 3,108,836 A | * | 10/1963 | Deckert | 296/204 |
| 4,163,578 A | * | 8/1979 | Watson | 296/204 |
| 4,402,545 A | * | 9/1983 | Utsunomiya et al. | 296/204 |
| 5,613,727 A | * | 3/1997 | Yamazaki | 296/209 |
| 5,829,824 A | * | 11/1998 | Yamamuro et al. | 296/204 |
| 5,921,618 A | * | 7/1999 | Mori et al. | 296/204 |
| 6,203,099 B1 | * | 3/2001 | Iwatsuki | 296/204 |
| 6,811,211 B2 | * | 11/2004 | Saito | 296/204 |
| 6,926,352 B2 | * | 8/2005 | Gotou et al. | 296/204 |
| 7,104,596 B2 | * | 9/2006 | Goto et al. | 296/204 |
| 7,140,642 B2 | * | 11/2006 | Ito et al. | 280/834 |
| 7,178,861 B2 | * | 2/2007 | Yamada et al. | 296/204 |
| 7,188,893 B2 | * | 3/2007 | Akasaka | 296/204 |

FOREIGN PATENT DOCUMENTS

JP 2001-063620 3/2001

* cited by examiner

*Primary Examiner*—Kiran B. Patel
(74) *Attorney, Agent, or Firm*—Rankin, Hill, Porter & Clark LLP

(57) ABSTRACT

A structure for mounting a vehicle seat includes: a side sill extending in a front-rear direction of a vehicle body on a side of the vehicle body; a cross member extending in a width direction of the vehicle body; a floor frame substantially extending in a front-rear direction of the vehicle body, with an end portion curved and joined to the side sill, and thus bridging the side sill and the cross member; a seat-mounting bracket joined to the floor frame; and a seat fixed at least to the seat-mounting bracket. With this structure, the seat can be securely fixed to the vehicle body.

5 Claims, 6 Drawing Sheets

STRUCTURE FOR MOUNTING VEHICLE SEAT

CROSS-REFERENCE TO RELATED APPLICATIONS

This application claims the foreign priority benefit under Title 35, United States Code, § 119 (a)-(d), of Japanese Patent Application No. 2005-164542, filed on Jun. 3, 2005 in the Japan Patent Office, the disclosure of which is herein incorporated by reference in its entirety.

BACKGROUND OF THE INVENTION

1. Field of the Invention

The present invention relates to a structure for mounting a seat in a body of a vehicle.

2. Description of the Related Art

An automobile, which is a representative example of vehicle, generally has two front seats (driver seat and passenger seat), and optionally a rear bench seat. FIG. 6 is a side view of a main part of a conventional structure for mounting an automobile seat, with a front seat mounted thereon. FIG. 7 is an enlarged perspective view of a main part of a conventional structure for mounting a front seat, showing an arrangement of a cross member and a seat-mounting bracket.

As shown in FIG. 6, in a conventional structure for mounting an automobile seat, a front seat 100 to be used as a driver seat or a passenger seat has base frames 120 provided on a lower face of a seat cushion 110 in such a manner that the base frames 120 (and thus the front seat 100) can slide in a front-rear direction along a seat rail 300 bridging a cross member 200 and a seat-mounting bracket 400. The seat rail 300 is fixed to a floor panel 800, by fixing a front end portion and a rear end portion of the seat rail 300 to the cross member 200 and the seat-mounting bracket 400 provided on the floor panel 800, respectively (see, for example, Japanese Patent Application Kokai No. 2001-63620A, paragraphs 0012-0016 and FIGS. 3 and 5).

As shown in FIG. 7, the cross member 200 extends in a width direction of the car body between a pair of side sills 600 each extending in a front-rear direction on both lateral sides of the car body, and bridges the pair of side sills 600 and a center sill 500 extending in a front-rear direction at a center of the car body (only one side sill is shown in the drawing).

The center sill 500 is located at a center of the car body in nearly parallel with the side sills 600.

The seat-mounting bracket 400 is fixed to the center sill 500-side lateral face of the side sill 600 by spot welding.

The floor panel 800 is spot-welded to the lower faces of the side sill 600, the cross member 200 and the seat-mounting bracket 400, and supported by the center sill 500 placed below the floor panel 800.

When an automobile having the above-described structure crashes head-on, an inertia force in a forward direction of an arrow G is exerted on the front seat 100, as shown in FIG. 6. As a result, a load in a direction of an arrow H is exerted on the seat-mounting bracket 400, which tends to detach the seat-mounting bracket 400 from the floor panel 800. Therefore, conventionally, a reinforcing bracket 700 for strengthening the seat-mounting bracket 400 is provided and the seat-mounting bracket 400 is fixed to the floor panel 800 with a bolt 900 (see FIG. 7), in order to prevent the seat-mounting bracket 400 from being detached from the floor panel 800 during collision.

The reinforcing bracket 700 is placed immediately below the seat-mounting bracket 400 through the floor panel 800, with one end of the reinforcing bracket 700 being fixed to the side sill 600 and the other end fixed to the center sill 500. In other words, the reinforcing bracket 700 bridges the side sill 600 and the center sill 500 while supporting the seat-mounting bracket 400.

However, in the case of the structure disclosed in the above-mentioned patent document, problems arise in that addition of the reinforcing bracket 700 and the bolt 900 to the seat-mounting bracket 400 inevitably increases the number of parts, assembling processes and weight of the car body.

Therefore, it would be desirable if a structure for mounting a vehicle seat is provided that can securely mount a seat in a vehicle body, without increasing the number of parts, assembling processes, weight of the vehicle body and the like.

SUMMARY OF THE INVENTION

In one aspect of the present invention, a structure for mounting a vehicle seat is provided which includes: a side sill extending in a front-rear direction of a vehicle body on a side of the vehicle body; a cross member extending in a width direction of the vehicle body; a floor frame substantially extending in a front-rear direction of the vehicle body and having an end portion which is curved and joined to the side sill, the floor frame bridging between the side sill and the cross member; a seat-mounting bracket joined to the floor frame; and a seat fixed at least to the seat-mounting bracket.

BRIEF DESCRIPTION OF THE DRAWINGS

The various aspects, other advantages and further features of the present invention will become more apparent by describing in detail illustrative, non-limiting embodiments thereof with reference to the accompanying drawings.

DETAILED DESCRIPTION OF THE EXEMPLARY EMBODIMENTS

Embodiments of the present invention will be described below in detail with reference to the accompanying drawings. In the following description, the present invention is exemplified with an automobile, and terms "front", "rear", "upper" and "lower" mean respective sides relative to the car body, and terms "left" and "right" mean respective sides relative to the car body when seen from a driver/passenger seated in the car body.

<Car Body>

Figure 1:
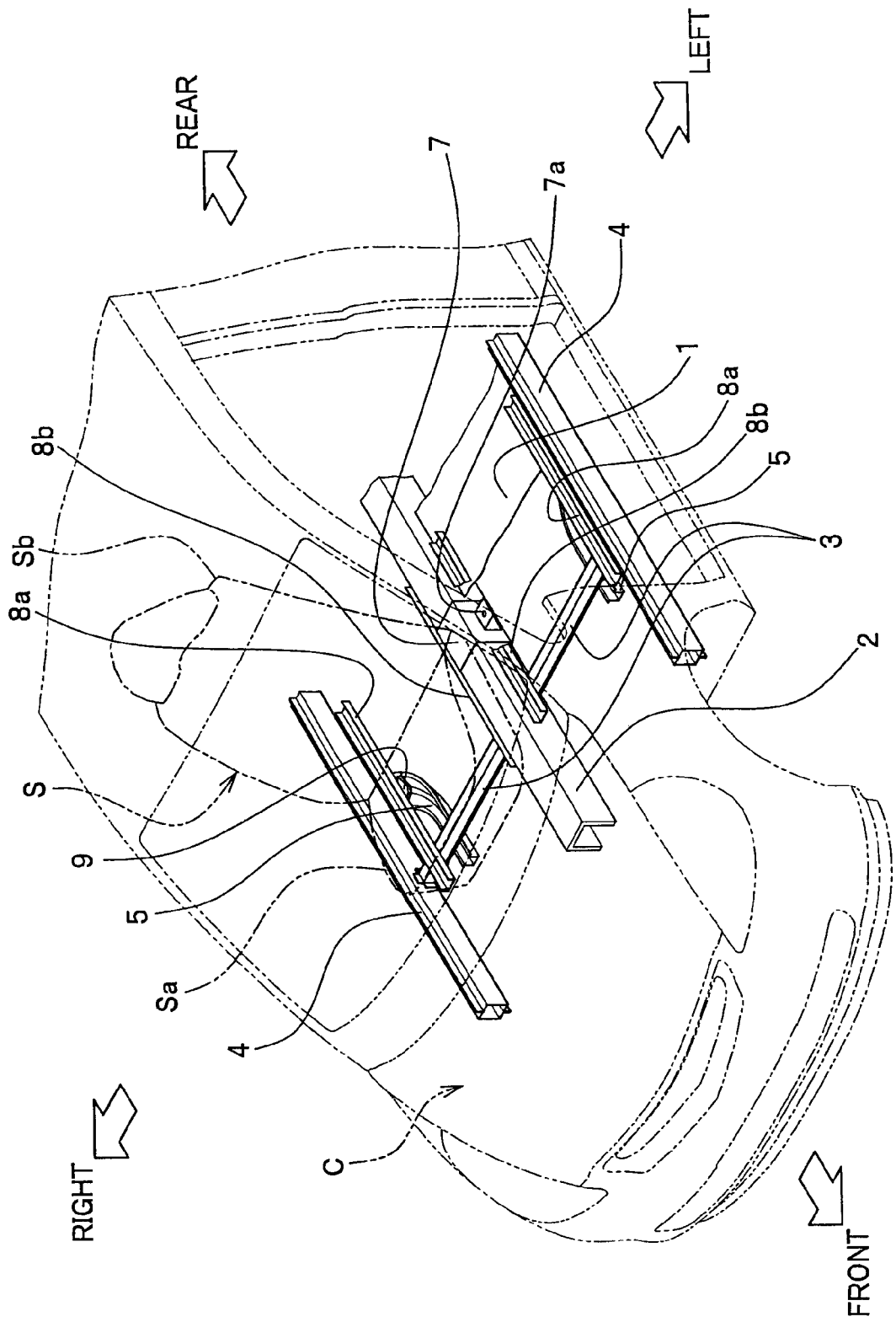
FIG. 1 is a schematic perspective view of a structure for mounting a vehicle seat according to one embodiment of the present invention.

Referring to FIG. 1, a car body C of an automobile is formed of a metal plate having high strength, such as steel plate and aluminum alloy plate. A vehicle interior provided by the car body C has a floor panel 1 (partially cut away in the drawing) on which a seat S is mounted. In addition, a floor face of the car body C is provided mainly with: a center sill 2 extending in a front-rear (longitudinal) direction at a center of the car body C; a cross member 3 extending in a width (traverse) direction of the car body C which is perpendicular to the extending direction of the center sill 2; a pair of side sills 4,4 each extending in a front-rear direction and joined to a corresponding end of the cross member 3; and floor frames 5,5 each joined to the corresponding side sill 4 and the cross member 3. As a whole, the car body C is formed bilaterally symmetrical with the center sill 2 as a line of symmetry. Hereinbelow, descriptions will be made frequently with respect to a front seat mounted on the right side of the car body C, for the sake of convenience. In this embodiment, similar explanations are applied to a front seat on the other side, though an arrangement of parts is mirror-image with respect to a longitudinal center line of the car body C.

<Floor Panel>

Referring to FIG. 1, the floor panel 1 is formed of a relatively thin metal plate, such as steel plate and aluminum alloy plate. The floor panels 1,1 are placed between the side sill 4 on the left side and the center sill 2, and between the side sill 4 on the right side and the center sill 2. To an upper face of the floor panel 1, a seat-holding member 6 (see FIG. 2) and the cross member 3, which are joined to a slide rail 8a provided on a lower face of the seat S, are welded by arc welding, spot welding or the like. To a lower face of the floor panel 1, the floor frame 5 is provided.

<Center Sill>

The center sill 2, also called a floor tunnel, is a member having high strength and rigidity and made of thick metal plate, such as steel plate and aluminum alloy plate. The center sill 2 has a square U-shaped cross section with an opening located on the bottom (that is, upside-down square U-shaped cross section) when seen from the front. To a portion of a side wall of the center sill 2 near a front end portion of the seat S, the cross member 3 is fixed by spot welding or the like. On a portion of the center sill 2 near a rear end portion of the seat S, a seat-holding member 7 is provided.

<Cross Member>

Figure 2:
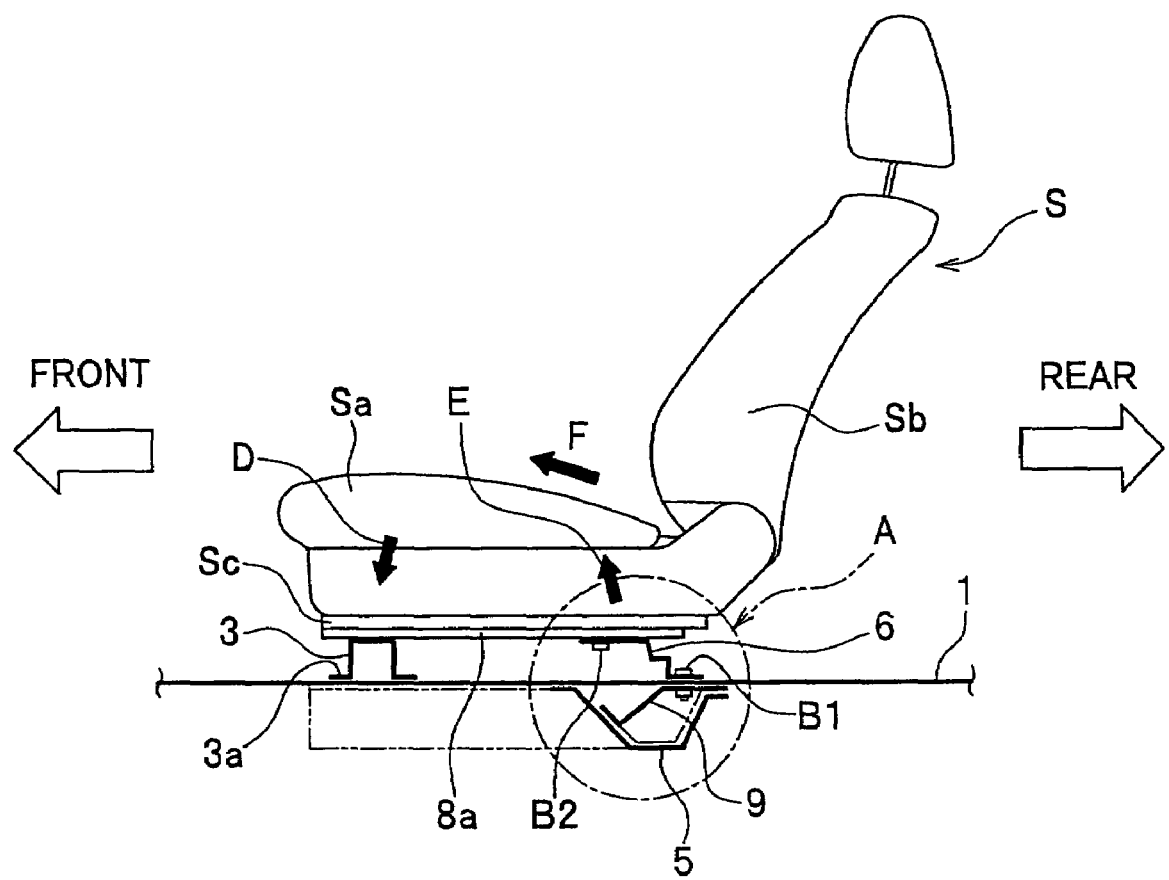
FIG. 2 is a schematic side view of a main part of the structure for mounting a vehicle seat according to the embodiment of the present invention.

The cross member 3 is made of a thick metal plate, such as steel plate and aluminum alloy plate, and has a nearly hat-shaped cross section with an opening on the bottom, when seen from a lateral side as shown in FIG. 2. The cross member 3 has brim parts 3a for joining to other parts and reinforcing itself, at a lower front end portion, a lower rear end portion, a left end portion and a right end portion. A half of the cross member 3 is located between the center sill 2 and the side sill 4 on the right side, and the other half is located between the center sill 2 and the side sill 4 on the left side, under which arrangement the brim parts 3a are joined to the center sill 2 and the side sills 4,4 by spot welding or the like, and thus the cross member 3 extends in a width direction of the car body C (see FIG. 1).

<Side Sill>

Figure 3:
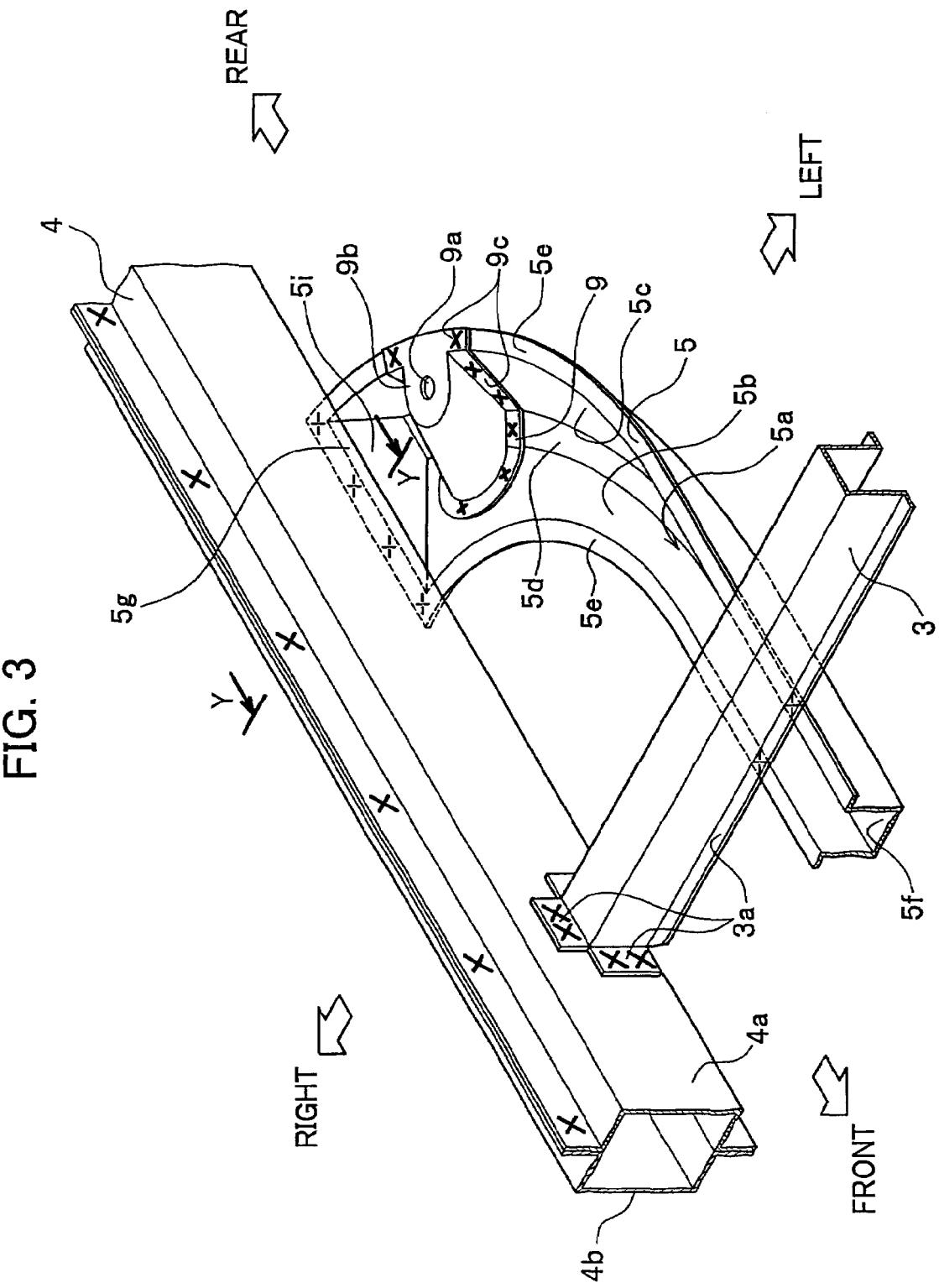
FIG. 3 is an enlarged schematic perspective view of a main part of the structure for mounting a vehicle seat according to one embodiment of the present invention, showing an arrangement of the floor frame with a floor panel removed.

As shown in FIG. 3, the side sill 4 is formed of an inner panel 4a and an outer panel 4b each made of a metal plate, such as steel plate and aluminum alloy plate, with which a closed cross section is formed therebetween. The side sill 4 extends between a front wheel and a rear wheel (not shown) on a side (right side in the drawing) of the car body C, in nearly parallel with the center sill 2. To an inner lateral face of the side sill 4, portions of the brim parts 3a of the cross member 3 are joined by spot welding or the like, and to a lower face of the side sill 4, portions of brim parts 5e of the floor frame 5 are joined in a similar manner.

Figure 4:
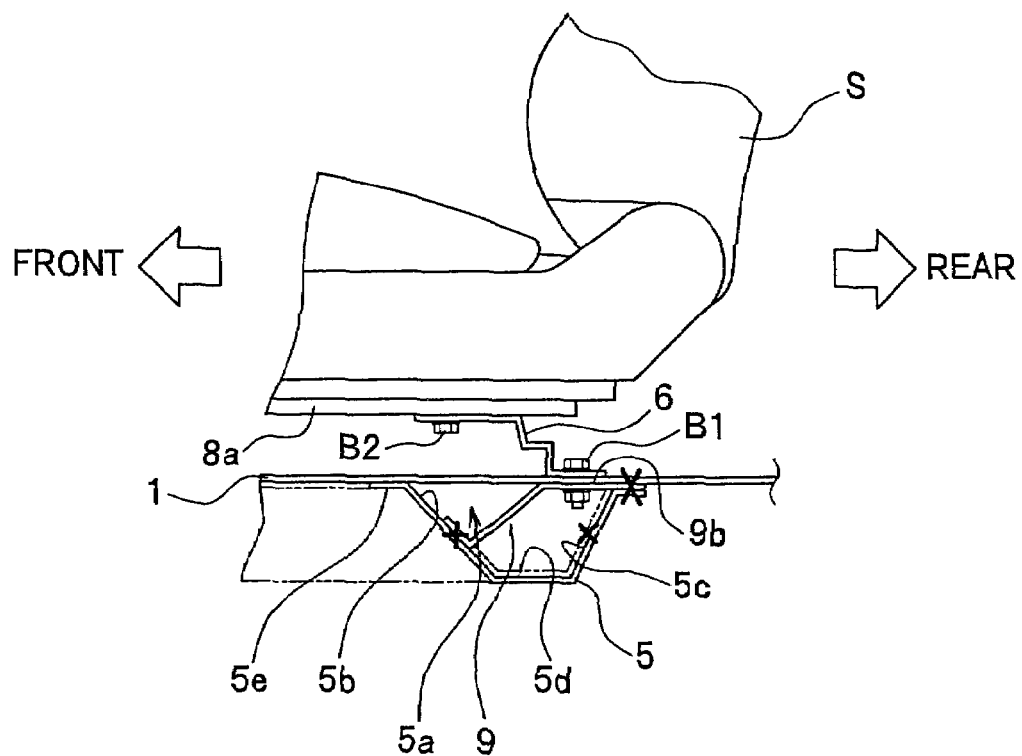
FIG. 4 is an enlarged view of a part A of FIG. 2.
Figure 5:
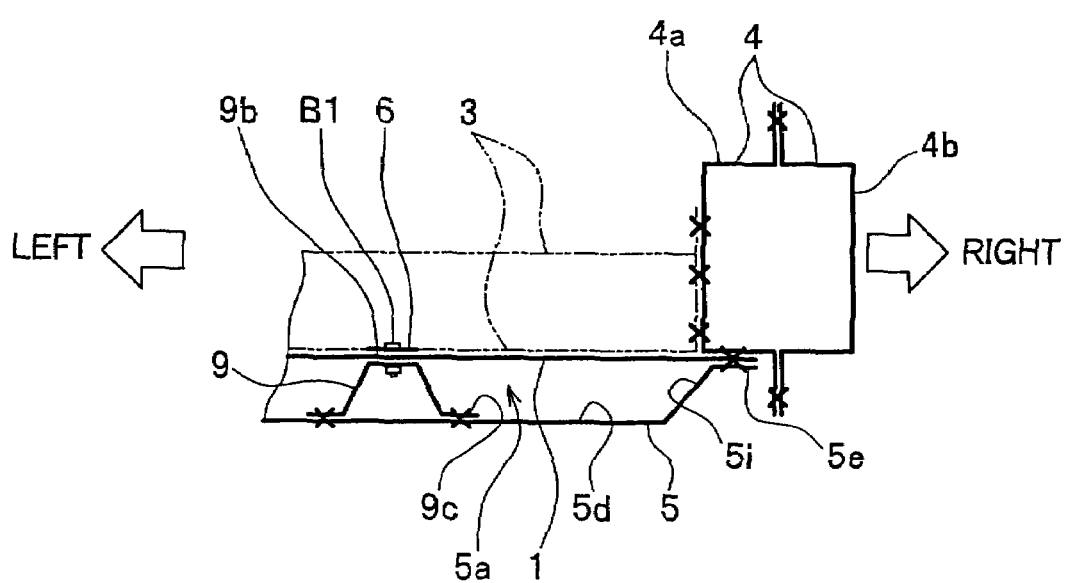
FIG. 5 is a sectional view taken along line Y-Y in FIG. 3.
Figure 6:
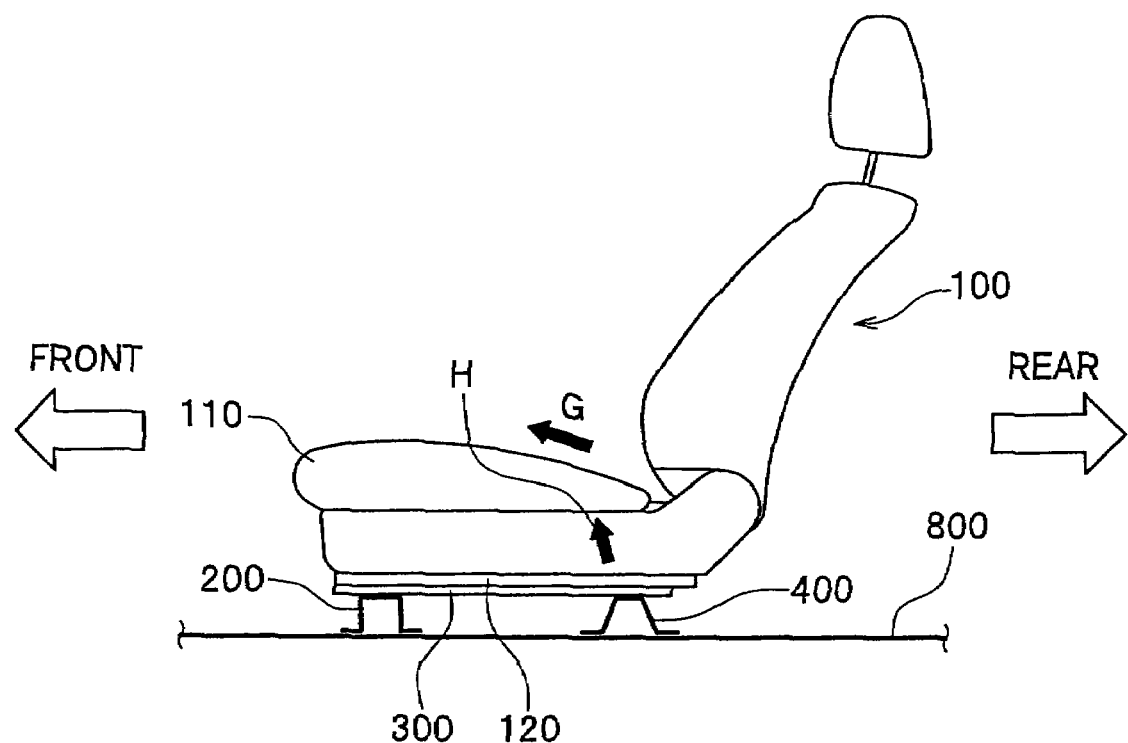
FIG. 6 is a side view of a main part of a conventional structure for mounting an automobile seat, with a front seat mounted thereon.
Figure 7:
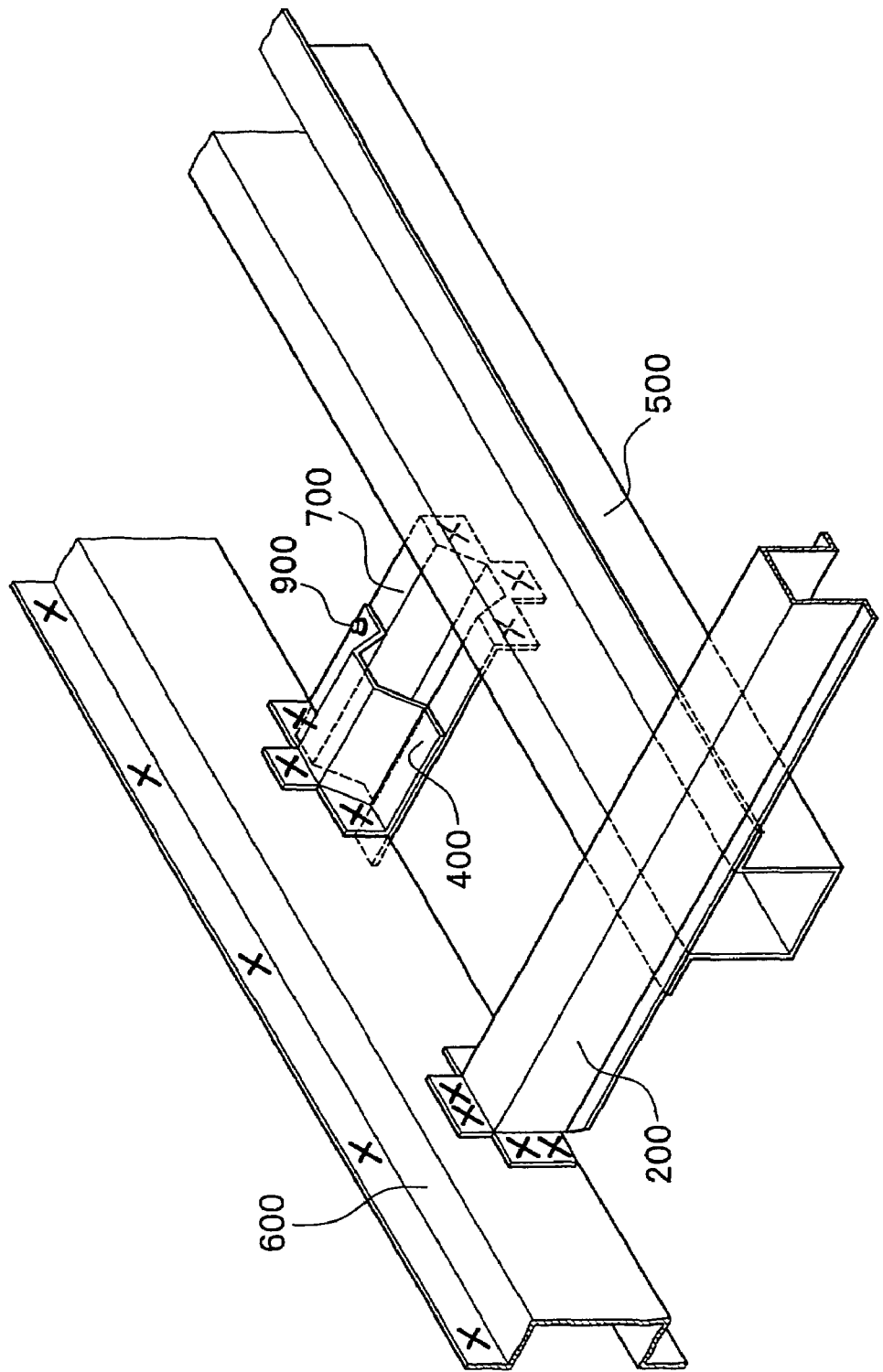
FIG. 7 is an enlarged perspective view of a main part of a conventional structure for mounting a front seat, showing an arrangement of a cross member and a seat-mounting bracket.

It should be noted that, in FIGS. 3-5, X marks indicate points at which portions of different members are spot-welded.

<Floor Frame>

As shown in FIG. 4, the seat-holding member 6 is provided on the upper face of the floor panel 1 and holds the seat S. The floor frame 5 serves as a reinforcing member for holding this seat-holding member 6 from the lower face of the floor panel 1. The floor frame 5 is a pressed metal plate, such as steel plate and aluminum alloy plate, and has a nearly U-shaped cross section with the brim parts 5e on edges of upper end portions. The term "a nearly U-shaped cross section" herein with respect to the floor frame implies any cross sectional shape, as long as an opening is located on an upper side, and thus the bottom part of the cross section may be in a square-shape or in a V-shape. To an upper face of the floor frame 5, a seat-mounting bracket 9 for fixing the seat S is joined in such a manner that the seat-mounting bracket 9 is accommodated in the floor frame 5, and upper faces of the brim parts 5e are brought into close contact with and joined to the floor panel 1, and a closed cross section is formed by the floor frame 5 and the floor panel 1.

As shown in FIG. 3, the floor frame 5 substantially extends in a front-rear direction of the car body C, and an end portion has an arc curvature from a cross member 3 side to a side sill 4 side (also see FIG. 1). The floor frame 5 is arranged and joined to the cross member 3 (through the floor panel 1) in such a manner that a front end part $5f$ of the floor frame 5 and the cross member 3 cross at right angles to each other. At the same time, the floor frame 5 is arranged and joined to the side sill 4 (through the floor panel 1) in such a manner that a rear end part $5g$ of the floor frame 5 and the side sill 4 cross at right angles to each other. For this reason, the floor frame 5 also serves as a reinforcing member firmly connecting the cross member 3 and the side sill 4 which are components of a framework of the car body C. It should be noted that the expression "substantially extend in a front-rear direction" used herein implies that the major portion of the floor frame 5 on the side of the cross member 3 extends in the front-rear direction, and the rest of the floor frame 5 extends somewhat in the width direction to be connected to the side sill 4.

As shown in FIG. 3, the front end part $5f$ is configured to have a square U-shape when seen from the front, with side walls $5b$ and $5c$ standing upright. The side walls $5b$ and $5c$ are tilted in such a manner that a closer portion of each of the side walls $5b$ and $5c$ to the rear end part $5g$ has gentler slope (or tilts more from the upright position), i.e. upper ends of the side walls $5b$ and $5c$ become more apart, and thus a portion of the floor frame 5 near the rear end part $5g$ is configured to have a nearly V-shaped (or valley-shaped) cross section. As a result, a width of the rear end part $5g$ is larger than a width of the front end part $5f$.

In this embodiment, a height of the rear end part 5g is made shorter than a height of the front end part 5f. In addition, as shown in FIG. 4, in the vicinity of a portion of the floor frame 5 where the seat-mounting bracket 9 is placed, the side wall 5b on the front side has a relatively gentle slope than a slope of the side wall 5c on the rear side.

As shown in FIGS. 3 and 4, a bottom plate 5d is horizontally formed nearly along a longitudinal direction of the floor frame 5.

The brim parts 5e are made horizontal along rims of the floor frame 5, except a front end edge. The portions of the brim part 5e near the front end part 5f are joined to a lower face of the cross member 3 through the floor panel 1, by spot welding or the like. Optionally, the front end part 5f may extend farther and join to a front portion of the framework of the car body C, such as a front side frame.

As shown in FIG. 3, portions of the brim parts 5e near the rear end part 5g are joined to the side sill 4 through the floor panel 1, by spot welding or the like. In the rear end part 5g, a sloping plate 5i is formed that tilts from the brim part 5e to the bottom plate 5d.

<Seat-Mounting Bracket>

As shown in FIG. 3, the seat-mounting bracket 9 is a pressed metal plate, such as steel plate and aluminum alloy plate, and has: a through-hole 9a for insertion of a bolt B1 for fixing the seat-holding member 6 to the seat-mounting bracket 9 through the floor panel 1; and a seating plate 9b with which the lower face of the floor panel 1 is brought into close contact when tightened with the bolt B1 (see FIG. 4). A rigidity of the seat-mounting bracket 9 is retained high, since the seat-mounting bracket 9 is pressed by a pressing machine so as to have flange parts 9c to be brought into close contact with an upper face of the bottom plate 5d, inner faces of the side walls 5b, 5c and the upper faces of the brim parts 5e of the floor frame 5, as well as the flat seating plate 9b on which the floor panel 1 (see FIG. 4) is mounted. The seat-mounting bracket 9 is placed relatively near the side sill 4 on the floor frame 5, in such a manner that a rear side portion of the seat-mounting bracket 9 is joined to the upper face of the brim part 5e, and a front side portion of the seat-mounting bracket 9 is joined to the inner face of the side wall 5b. Since the seat-mounting bracket 9 is brought into close contact with the upper face of the brim part 5e and inner faces of the floor frame 5, a closed cross section is formed by the seat-mounting bracket 9 and the floor frame 5 and thus strength is improved. For this reason, the seat-mounting bracket 9 serves as a reinforcing member for preventing the floor frame 5 from deforming due to an impact force during collision.

It should be noted that at least a portion of the seat-mounting bracket 9 is joined to the inner face of the side wall 5b of the floor frame 5 by spot welding or the like. In addition, to a lower face of the seating plate 9b, a nut with which the bolt B1 is threadably engaged is joined by electric resistance welding or the like.

<Seat>

The seat S shown in FIG. 2 is a front seat to be mounted on driver side or passenger side. The seat S mounted on the floor panel 1 is formed of, for example, a seat cushion Sa; a seat back Sb; base frames Sc placed on a lower face of the seat cushion Sa; the slide rail 8a located near the side of the car body C and a slide rail 8b located near the center of the car body C; and the seat-holding members 6 and 7 (see also FIG. 1). The seat S is installed in the car body C, by fixing front end portions of the slide rails 8a and 8b to the floor panel 1 through the cross member 3; fixing a rear end portion of the slide rail 8a to the seat-mounting bracket 9 with the bolt B1 through the seat-holding member 6 and the floor panel 1; and fixing a rear end portion of the slide rail 8b to a mounting part 7a of the seat-holding member 7 with a bolt (not shown) (see FIG. 1). It should be noted that, in the seat S, the base frames Sc are located, for example, at right and left sides on the lower face of the seat cushion Sa in a front-rear direction, and engaged with the corresponding slide rails 8a and 8b in such a manner that the seat S can slide in a front-rear direction.

<Slide Rail>

As shown in FIG. 2, the front end portion of each of the slide rails 8a and 8b is fixed onto the cross member 3 with a bolt (not shown) or the like, and the rear end portion of the slide rail 8a is fixed with a bolt B2 or the like to the seat-holding member 6 which is secured to the floor frame 5 and the floor panel 1 with the bolt B1 or the like; and as shown in FIG. 1, the rear end portion of the slide rail 8b is fixed to the seat-holding member 7 mounted on the center sill 2 with a bolt or the like (not shown).

<Seat-Holding Member>

As shown in FIGS. 1 and 2, the seat-holding members 6 and 7 formed by press molding are metallic holding fixtures configured to fix the rear end portions of the slide rails 8a and 8b, respectively, to the car body C.

With respect to the seat-holding member 6, which is located on the right side, an upper end portion is fixed to the slide rail 8a with the bolt B2 and a lower end portion is fixed to the floor panel 1 and the seat-mounting bracket 9 with the bolt B1, as shown in FIGS. 2 and 4.

The seat-holding member 7, which is located on the left side, is formed of a plate member which is engaged with and bolted to the center sill 2, as shown in FIG. 1, and has a nearly squared U-shaped cross section with the opening located on the bottom when seen from the front. On each of lateral side walls of the seat-holding member 7, a flat mounting part 7a for mounting and bolting the slide rail 8b is provided.

<Effect>

Next, effect of the structure for mounting an automobile seat according to one embodiment of the present invention will be described with reference to FIGS. 1-5.

For example, when a person is seated on the seat S located on the right side, a weight of the person, and also an inertia force exerted during sudden stop and the like, are applied to the seat-holding members 6, 7 and the cross member 3, through the seat cushion Sa, the base frames Sc and the slide rails 8a and 8b (see FIG. 2).

The load on the seat-holding member 6, located on the right side, is transmitted to the floor panel 1, but generation of a large stress is prevented since the floor panel 1 is reinforced with the seat-mounting bracket 9 and the floor frame 5 overlapping below the floor panel 1. Therefore, the seat-holding member 6, located on the right side, is surely prevented from being detached from the floor panel 1, which may otherwise be caused by the inertia force exerted during sudden stop and the like. In other words, the seat S is securely supported by a simple structure formed of the seat-holding member 6, the floor panel 1, the seat-mounting bracket 9 and the floor frame 5, overlapping one another.

On the other hand, the load on the seat-holding member 7, located on the left side, is transmitted to the center sill 2. Since the center sill 2 has high rigidity and strength as a floor tunnel, generation of a large stress is prevented. Therefore, the seat-holding member 7 is prevented from being detached from the center sill 2, which may otherwise be caused by the inertia force exerted during sudden stop and the like.

In a case where an automobile hits the front thereof, for example crashes head-on, a larger load in a direction of an arrow F than the above-mentioned load is exerted on the seat S, as shown in FIG. 2. As a result, on the cross member 3 located on the lower front side of the seat S, a load in a downward direction of an arrow D is exerted, while on the seat-holding members 6,7 located on a lower rear side of the seat S, a load (inertia force) in an upward direction of an arrow E is exerted.

The load in the downward direction of the arrow D exerted on the cross member 3 presses the floor panel 1 and the floor frame 5 beneath the floor panel 1. Since a portion of the floor frame 5 overlaps the cross member 3 through the floor panel 1, the floor frame 5 supports the cross member 3 from the lower side.

The load in a direction of the arrow E exerted on the outer seat-holding member 6 is transmitted to the floor panel 1, the seat-mounting bracket 9 and the floor frame 5. Since the seat-holding member 6, the floor panel 1, the seat-mounting bracket 9 and the floor frame 5 overlap and reinforce one another, generation of a large stress in the floor panel 1 is prevented. Therefore, the seat-holding member 6 is prevented from being detached from the floor panel 1.

In this case of an excessive load in the direction of the arrow E exerted on the seat S which tends to detach the seat S from the floor panel 1, the load acts as a shearing load to the seat-mounting bracket 9. As a result, the seat-mounting bracket 9 improves a tolerance of the seat S to the load that tends to detach the seat S from the floor panel 1.

In addition, since the floor frame 5 is brought into close contact and unified with the flange part 9c provided on the entire circumference of the seat-mounting bracket 9, the excessive load on the seat-mounting bracket 9 is transmitted to the floor flame 5, and due to reaction forces exerted in the cross member 3 and the side sill 4 to which either of the end portions of the floor frame 5 is joined, the floor frame 5 is prevented from being deformed in an upward direction of the arrow E.

Therefore, the seat S is surely prevented from being detached from the floor panel 1.

On the other hand, the load on the seat-holding member 7, located on the left side, during collision is transmitted to the center sill 2. Since the center sill 2 has high rigidity and strength as a floor tunnel, the seat-holding member 7 is prevented from being moved.

As described in detail above, according to the structure for mounting a vehicle seat of the present invention, the seat-mounting bracket is joined to the floor flame having relatively high strength, and therefore additional reinforcement is not necessary. Since the floor frame bridges the cross member and the side sill which have high rigidity and strength, the floor frame as well as the seat can be firmly fixed. When an excessive load is exerted on the seat, the load can be distributed to the side sill and the cross member, through the floor frame. Therefore, the seat mounted on the floor frame can be securely mounted in the car body, without increasing the number of parts, assembling processes and weight of the car body.

In addition, at least a portion of the seat-mounting bracket may preferably be joined to the inner face of the side wall of the floor frame. Therefore, when an excessive load (inertia force) is exerted on the seat which tends to detach the seat from the floor panel, the load acts as a shearing load relative to the seat-mounting bracket. As a result, the seat-mounting bracket improves a tolerance of the seat to the load that tends to detach the seat from the floor panel, leading to prevention of the seat from being detached.

Further, with respect to the seat-mounting bracket, the rear side portion may preferably be joined to the upper face of the brim part of the floor frame, and the front side portion may preferably be joined to the inner face of the side wall on the car front side. As a result, a closed cross section is formed by the seat-mounting bracket and the floor frame, in addition to a closed cross section formed by the floor panel and the floor frame. With this configuration, strength of the portion for fixing the seat is improved, which prevents deformation of the floor frame which may otherwise be caused by an excessive load exerted during collision. As a result, the seat is prevented from being detached.

The present invention is not limited to the particular embodiments discussed above, and may be carried out in various modified forms.

For example, in the embodiment above, the floor frame is joined to the cross member and the side sill at the front portion and the rear portion of the floor frame, respectively. However, the front portion of the floor frame may be joined to the side sill and the rear portion of the floor frame may be joined to the cross member. In this case, a structure for mounting a vehicle seat can be provided which has a high tolerance to an impact from a rear side.

In the embodiment above, the seat S is explained in which the base frames Sc can slidably move in a front-rear direction along the slide rails 8a and 8b. However, the present invention is not limited to movable seats, and the base frames Sc may be fixed to the floor panel 1. Moreover, the seat S may be a bench type seat on which a plurality of passengers can be seated, or the seat S may be a rear seat.

Though the explanation above is made with reference to the center sill 2 that has an opening on the lower side as a central portion of the seat mounting structure in the vehicle interior, the central portion of the seat mounting structure should not be limited to this center sill. For example, the floor panel may be set flat to cover an entire floor face, and the seat-holding member may be supported from the lower side of the central portion of the floor panel, by the center sill having a nearly hat-shaped cross section with the opening on the upper side.

In the embodiment above, a single floor panel is provided per single structure for mounting a vehicle seat. However, a single floor panel may cover a plurality of structures for mounting vehicle seats. In the embodiment above, the floor panel having a flat shape is placed below the cross member. However, the floor panel should not be limited to a flat shape, and may be pressed to have a shape that covers the upper face of the cross member.

In the embodiment above, the base frame is fixed to the floor panel and the seat-mounting bracket through the seat-holding member. However, the base frame may be directly fixed to the floor panel and the seat-mounting bracket, not through the seat-holding member. In other words, the seat-holding member may be omitted.

In the embodiment above, the automobile has two side sills, one center sill and one cross member. However, the number of the components should not be limited to these, as long as the components have an arrangement that allows the floor frame(s) to be installed in the structure. In addition, the arrangement of the components may not be bilaterally symmetrical.

Though the embodiment above is described with reference to automobile, the structure for mounting a vehicle seat can be applicable to other types of vehicle, such as boats, ships, trains and air planes.

What is claimed is:

1. A structure for mounting a vehicle seat comprising:
a side sill extending in a front-rear direction on a side of a vehicle body;
a cross member extending in a width direction of the vehicle body;
a floor frame substantially extending in a front-rear direction of the vehicle body and having an end portion which is curved and joined to the side sill, the floor frame bridging between the side sill and the cross member;
a seat-mounting bracket joined to the floor frame; and
a seat fixed at least to the seat-mounting bracket.

2. The structure according to claim 1, wherein:
the floor frame is configured to have a nearly U-shaped cross section with an opening located on an upper face side, and
at least a portion of the seat-mounting bracket is joined to an inner face of a side wall of the floor frame.

3. The structure according to claim 2, wherein:
the floor frame is configured to have brim parts on edges of the opening, and
a rear side portion of the seat-mounting bracket is joined to an upper face of the brim part, and a front side portion of the seat-mounting bracket is joined to an inner face of the side wall on the vehicle front side.

4. The structure according to claim 1, which is used for an automobile.

5. A vehicle comprising a structure for mounting a vehicle seat, said vehicle seat mounting structure comprising:
a side sill extending in a front-rear direction on a side of a vehicle body;
a cross member extending in a width direction of the vehicle body;
a floor frame substantially extending in a front-rear direction of the vehicle body and having an end portion which is curved and joined to the side sill, the floor frame bridging between the side sill and the cross member;
a seat-mounting bracket joined to the floor frame; and
a seat fixed at least to the seat-mounting bracket.

* * * * *